(12) United States Patent
Strandqvist

(10) Patent No.: US 9,194,084 B2
(45) Date of Patent: *Nov. 24, 2015

(54) METHOD OF PRODUCING A HYDROENTANGLED NONWOVEN MATERIAL

(75) Inventor: Mikael Strandqvist, Lindome (SE)

(73) Assignee: SCA HYGIENE PRODUCTS AB, Göteborg (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/398,028

(22) PCT Filed: May 3, 2012

(86) PCT No.: PCT/SE2012/050460
§ 371 (c)(1),
(2), (4) Date: Oct. 30, 2014

(87) PCT Pub. No.: WO2013/165287
PCT Pub. Date: Nov. 7, 2013

(65) Prior Publication Data
US 2015/0083354 A1 Mar. 26, 2015

(51) Int. Cl.
*D04H 5/03* (2012.01)
*D21H 15/06* (2006.01)
*D21H 13/10* (2006.01)
(Continued)

(52) U.S. Cl.
CPC ............. *D21H 11/00* (2013.01); *D04H 1/498* (2013.01); *D04H 5/03* (2013.01); *D21H 15/06* (2013.01); *D21H 13/10* (2013.01)

(58) Field of Classification Search
CPC ......... D04H 5/03; D04H 1/498; D04H 1/492; D21H 15/06; D21H 13/10; D21H 11/00; D21H 13/00; D21H 23/50
See application file for complete search history.

(56) References Cited

U.S. PATENT DOCUMENTS

| | | |
|---|---|---|
| 4,808,467 A | 2/1989 | Suskind et al. |
| 4,813,864 A | 3/1989 | Balk |
| 4,931,355 A | 6/1990 | Radwanski et al. |

(Continued)

FOREIGN PATENT DOCUMENTS

| | | |
|---|---|---|
| CA | 841938 A | 5/1970 |
| EP | 0308320 A2 | 3/1989 |

(Continued)

OTHER PUBLICATIONS

International Search Report (PCT/ISA/210) mailed on Nov. 9, 2012, by the Swedish Patent Office as the International Searching Authority for International Application No. PCT/SE2012/050460.

(Continued)

*Primary Examiner* — Jose Fortuna
(74) *Attorney, Agent, or Firm* — Buchanan Ingersoll & Rooney PC

(57) ABSTRACT

A method of producing a nonwoven material by hydroentangling a fiber mixture containing spunlaid filaments, natural fibers and synthetic staple fibers, wherein a fibrous web of natural fibers and at least 10% by fiber weight of manmade staple fibers is wetlaid by means of an inclined wire formation, the wetlaid fibrous web is hydroentangled in a first hydroentangling station and spunlaid filaments are laid on top of said hydroentangled wetlaid fibrous web to form a combined web. The combined web is hydroentangled in a second hydroentangling station.

9 Claims, 1 Drawing Sheet

(51) Int. Cl.
*D21H 11/00* (2006.01)
*D04H 1/498* (2012.01)

(56) References Cited

U.S. PATENT DOCUMENTS

| | | | |
|---|---|---|---|
| 4,939,016 A | 7/1990 | Radwanski et al. | |
| 4,950,531 A | 8/1990 | Radwanski et al. | |
| 5,009,747 A | 4/1991 | Viazmensky et al. | |
| 5,253,397 A | 10/1993 | Neveu et al. | |
| 5,290,628 A | 3/1994 | Lim et al. | |
| 5,324,580 A | 6/1994 | Allan et al. | |
| 5,545,371 A | 8/1996 | Lu | |
| 5,720,851 A | 2/1998 | Reiner | |
| 6,058,583 A | 5/2000 | Takeuchi et al. | |
| 6,063,717 A | 5/2000 | Ishiyama et al. | |
| 6,110,848 A | 8/2000 | Bouchette | |
| 6,163,943 A | 12/2000 | Johansson et al. | |
| 6,550,115 B1 | 4/2003 | Skoog et al. | |
| 7,326,318 B2 * | 2/2008 | Strandqvist | 162/109 |
| 7,331,091 B2 * | 2/2008 | Strandqvist | 28/104 |
| 7,422,660 B2 | 9/2008 | Billgren et al. | |
| 7,998,889 B2 * | 8/2011 | Stralin et al. | 442/408 |
| 8,389,427 B2 * | 3/2013 | Gustafsson et al. | 442/408 |
| 8,763,219 B2 * | 7/2014 | Jonsson et al. | 28/104 |
| 2002/0157766 A1 | 10/2002 | Vuillaume et al. | |
| 2003/0106195 A1 | 6/2003 | Fleissner | |
| 2003/0232553 A1 * | 12/2003 | Strandqvist | 442/59 |
| 2005/0022954 A1 * | 2/2005 | Strandqvist | 162/115 |
| 2005/0091811 A1 * | 5/2005 | Billgren et al. | 28/104 |
| 2005/0092417 A1 | 5/2005 | Billgren et al. | |
| 2005/0159065 A1 * | 7/2005 | Stralin et al. | 442/327 |
| 2007/0067973 A1 | 3/2007 | Conner | |
| 2008/0261476 A1 * | 10/2008 | Strandqvist et al. | 442/334 |
| 2010/0075120 A1 | 3/2010 | Gustafsson et al. | |
| 2010/0143684 A1 | 6/2010 | Geel et al. | |
| 2015/0083354 A1 * | 3/2015 | Strandqvist | 162/146 |

FOREIGN PATENT DOCUMENTS

| | | | |
|---|---|---|---|
| EP | 0411752 A1 | 2/1991 | |
| EP | 0534863 A1 | 3/1993 | |
| EP | 0333228 B1 | 2/1994 | |
| EP | 0333211 B1 | 5/1994 | |
| EP | 0972873 A1 | 1/2000 | |
| EP | 0992338 A2 | 4/2000 | |
| EP | 1929080 | 6/2008 | |
| EP | 2116645 A1 | 11/2009 | |
| WO | WO 94/11557 A1 | 5/1994 | |
| WO | WO 96/02702 A1 | 2/1996 | |
| WO | WO 99/22059 A1 | 5/1999 | |
| WO | WO 02/055778 A1 | 7/2002 | |
| WO | WO 03/083197 A1 | 10/2003 | |
| WO | WO 03106748 A1 * | 12/2003 | |
| WO | 2005/042825 | 5/2005 | |
| WO | WO 2005/042819 A2 | 5/2005 | |
| WO | WO 2005/042822 A1 | 5/2005 | |
| WO | WO 2005059218 A1 * | 6/2005 | |
| WO | WO 2005087997 A1 * | 9/2005 | |
| WO | WO 2006/007168 A1 | 1/2006 | |
| WO | WO 2006001739 A1 * | 1/2006 | |
| WO | WO 2008/066417 A1 | 6/2008 | |
| WO | WO 2013165287 A1 * | 11/2013 | |

OTHER PUBLICATIONS

Written Opinion (PCT/ISA/237) mailed on Nov. 9, 2012, by the Swedish Patent Office as the International Searching Authority for International Application No. PCT/SE2012/050460.

Extended European Search Report issued in corresponding European Patent Application No. 12779930.2; dated Jun. 25, 2015 (7 pages).

* cited by examiner

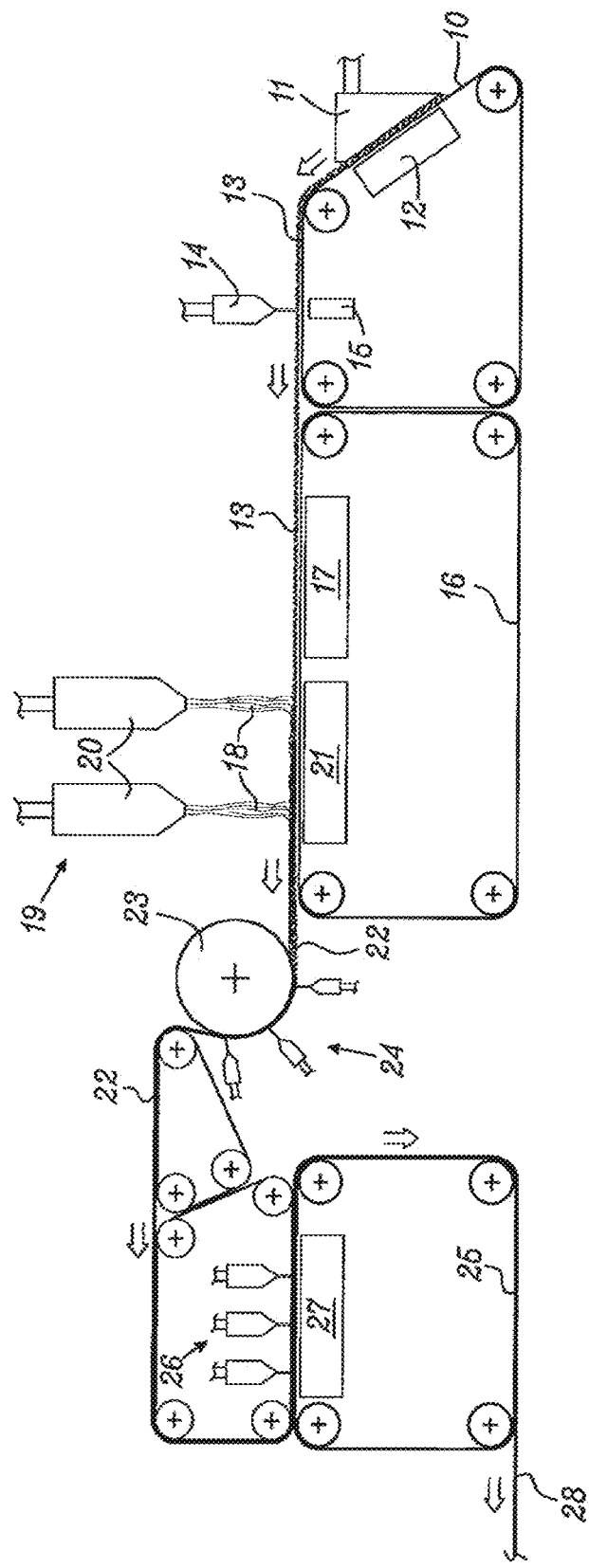

METHOD OF PRODUCING A HYDROENTANGLED NONWOVEN MATERIAL

TECHNICAL FIELD

Embodiments of the disclosure refer to a method for manufacturing a hydroentangled nonwoven material, said nonwoven material comprising a mixture of natural fibers, manmade staple fibers and spunlaid filaments.

BACKGROUND

Absorbing nonwoven materials are often used for wiping spills and leakages of all kinds in industrial, service, office and home locations. There are great demands on the properties of nonwoven materials made for wiping purposes. An ideal wiper should be strong, absorbent, abrasion resistant and exhibit low linting. It should further be soft and have a textile touch. Hydroentangled nonwoven materials are often used as wipes because of their absorbent and textile-like properties.

Hydroentangling or spunlacing is a technique introduced during the 1970'ies, see e.g., CA patent no. 841 938. The method involves forming a fiber web which is either drylaid or wetlaid, after which the fibers are entangled by means of very fine water jets under high pressure. Several rows of water jets are directed against the fiber web which is supported by a movable fabric. The entangled fiber web is then dried. The fibers that are used in the material can be synthetic or regenerated staple fibers, e.g., polyester, polyamide, polypropylene, rayon or the like, pulp fibers or mixtures of pulp fibers and staple fibers. Spunlace materials can be produced in high quality to a reasonable cost and have a high absorption capacity. They can, e.g., be used as wiping material for household or industrial use, as disposable materials in medical care and for hygiene purposes etc.

Through e.g., EP-B-0 333 211 and EP-B-0 333 228 it is known to hydroentangle a fiber mixture in which one of the fiber components consists of continuous filaments in the form of meltblown fibers. The base material, i e the fibrous material which is exerted to hydroentangling, either consists of at least two combined preformed fibrous layers where at least one of the layers is composed of meltblown fibers, or of a "coform material" where an essentially homogeneous mixture of meltblown fibers and other fibers is airlaid on a forming fabric.

Through EP-A-0 308 320 it is known to bring together a pre-bonded web of continuous filaments with a separately pre-bonded wetlaid fibrous web containing pulp fibers and staple fibers and hydroentangle together the separately formed fibrous webs to a laminate. In such a material the fibers of the different fibrous webs will not be integrated with each other since the fibers already prior to the hydroentangling are bonded to each other and only have a very limited mobility. The material will show a marked two-sidedness.

WO 99/22059 discloses a method of producing a nonwoven material by hydroentangling a mixture of continuous filaments, natural fibers and/or synthetic staple fibers. A fibrous web of natural fibers and/or synthetic staple fibers is foam-formed and hydroentangled and integrated with the continuous filaments, for example meltblown fibers.

WO 2005/042819 discloses a method of producing a nonwoven material by forming a web of continuous filaments on a forming fabric and applying a wet-formed fiber dispersion containing synthetic staple fibers having a length between 3 and 7 mm, and natural fibers on top of said continuous filaments. The fibrous web is subsequently hydroentangled to form a nonwoven material.

When making a high quality nonwoven material it is essential that a good fiber formation is achieved and maintained throughout the manufacturing process for both the continuous filaments and the wet laid layers. This gives a material with good visual impression and material properties. Wetlaying an aqueous fiber dispersion by means of inclined wire formation, as e.g. disclosed in EP 0 972 873, EP 1 929 080 and EP 0 411 752, uses a low consistency of the fiber dispersion and provides a good fiber formation. With inclined wire formation it is possible to handle both pulp fibers and short cut staple fibers mixed together. However, since the headbox is placed on an inclined wire a sealing is arranged between the headbox and the wire to prevent the fiber dispersion from running in the wrong direction. The seal makes it impossible for a prefabricated web, such as an unbonded filament web, to pass through the headbox.

In addition, wetlaying an aqueous fiber dispersion on top of a web of unbonded filaments will destroy the formation of the unbonded filaments, since the water will move around the filaments. Foam-forming of the fiber dispersion as disclosed in WO 99/22059 may solve this problem. The foam may however cause problems downstream in the process by making filtration of the hydroentangling water more complicated.

SUMMARY

An object of an embodiment of the disclosure is to provide an in-line process for manufacturing a hydroentangled nonwoven material, said nonwoven material comprising a mixture of natural fibers, manmade staple fibers and spunlaid filaments, wherein a good fiber formation is achieved and maintained throughout the process, resulting in a nonwoven material having good visual impression and material properties. In an embodiment of the disclosure, this has been achieved by a process comprising the steps of hydroentangling a fiber mixture containing spunlaid filaments, natural fibers and synthetic staple fibers, wetlaying a fibrous web of natural fibers and at least 10% by fiber weight of manmade staple fibers by means of inclined wire formation, hydroentangling said wetlaid fibrous web in a first hydroentangling station, laying spunlaid filaments on top of said hydroentangled wetlaid fibrous web to form a combined web, hydroentangling said combined web in a second hydroentangling station.

The combined web is hydroentangled from the side of the wetlaid fibrous web in the second hydroentangling station.

The fluid pressure used in the first hydroentangling station may be between 10 and 50 bars.

The fluid pressure used in the second hydroentangling station may be between 70 and 200 bars.

The wetlaid fibrous web of natural fibers and manmade staple fibers may contain between 10 and 40% by fiber weight manmade staple fibers and between 60 and 90% by fiber weight natural fibers.

The natural fibers may be wood pulp fibers.

The manmade staple fibers may have a length between 3 and 25 mm.

There may be no thermal bonding points between the spunlaid filaments.

The hydroentangled wetlaid fibrous web may be dewatered to a dry content of between 30 and 50 weight % before laying spunlaid filaments on top of said hydroentangled wetlaid fibrous web.

DEFINITIONS

Spunlaid Filaments

Filaments are fibers that in proportion to their diameter are very long, in principle endless. They can be produced by melting and extruding a thermoplastic polymer through fine nozzles, where after the polymer will be cooled, preferably by the action of an air flow blown at and along the polymer streams, and solidified into strands that can be treated by drawing, stretching or crimping. Chemicals for additional functions can be added to the surface. Filaments can also be produced by chemical reaction of a solution of fiber-forming reactants entering a reagent medium, e.g., by spinning of viscose fibers from a cellulose xanthate solution into sulphuric acid.

Spunlaid filaments are produced by extruding molten thermoplastic polymer through fine nozzles in very fine streams. The filaments are stretched by air to get an appropriate diameter. The fiber diameter is usually above 10 μm, often in the interval 10-100 μm. Production of spunbond is e.g., described in U.S. Pat. No. 4,813,864 or 5,545,371.

Any thermoplastic polymer, which has enough coherent properties to be drawn out in this way in the molten state, can in principle be used for producing spunlaid filaments. Examples of useful polymers are polyolefins, such as polyethylene and polypropylene, polyamides, polyesters and polylactides. Copolymers of these polymers may of course also be used, as well as natural polymers with thermoplastic properties.

Natural Fibers

There are many types of natural fibers that can be used in hydroentangled nonwoven material, especially those that have a capacity to absorb water and tendency to aid in creating a coherent sheet. Among the natural fibers possible to use there are primarily cellulosic fibers such as seed hair fibers, e.g., cotton, kapok, and milkweed; leaf fibers e.g., sisal, abaca, pineapple, and New Zealand hamp; or bast fibers e.g., flax, hemp, jute, kenaf, and pulp. Wood pulp fibers are especially well suited to use, and both softwood fibers and hardwood fibers are suitable. Recycled fibers can also be used.

The pulp fiber lengths will vary from around 3 mm for softwood fibers and around 1.2 mm for hardwood fibers and a mix of these lengths, and even shorter, for recycled fibers.

Staple Fibers

Manmade staple fibers used can be produced from the same polymeric substances as described for spunlaid filaments above. Other usable manmade staple fibers are those made from regenerated cellulose such as viscose and lyocell. Staple fibers are cut lengths from filaments. They can be treated with spin finish and crimped, but this is not necessary for the type of processes preferably used to produce embodiments of the material described in the present disclosure. The cutting of the fiber bundle normally is done so as to result in a single cut length, which is determined by the distance between the knives of the cutting wheel. Depending on the planned use different fiber lengths are used. Wetlaid hydroentangled nonwovens can use lengths between 3 and 25 mm.

BRIEF DESCRIPTION OF THE DRAWINGS

The disclosure will below be described with reference to an embodiment shown in the accompanying drawing.

FIG. 1 illustrates schematically a process for manufacturing a hydroentangled nonwoven material according to an embodiment of the disclosure.

DETAILED DESCRIPTION OF AN EMBODIMENT

One example of a method according to the disclosure for producing a hydroentangled nonwoven material is shown in FIG. 1. An aqueous dispersion of a mixture of natural fibers and manmade staple fibers is wetlaid on an inclined portion of a forming fabric 10 by a headbox 11, i.e. by so called inclined wire formation. The consistency of the fiber dispersion used in inclined wire formation is relatively low. This provides for a good fiber formation and capability to handle both pulp fibers and short cut staple fibers mixed together. The aqueous dispersion may besides water contain conventional papermaking additives such as wet and/or dry strength agents, retention aids and dispersing agents.

Inclined wire formation creates a relatively bulky web with a relatively high amount of fibers oriented in z-direction, which is an advantage in the subsequent hydroentangling step and also in the subsequent spunlaying step, when air is drawn through the web, as will be described below.

Water is sucked through the forming fabric 10 by means of suction boxes 12 arranged under the inclined portion of the forming fabric 10, so that a wetlaid fibrous web 13 comprising natural fibers and manmade staple fibers is formed on the forming fabric 10. A sealing (not shown) is arranged between the headbox 11 and the forming fabric 10 to prevent the fibers from running in the backward direction.

The proportion of natural fibers and manmade staple fibers used for forming the first fibrous web is between 60 and 90% by weight natural fibers and between 10 and 40% by weight manmade staple fibers. The natural fibers and manmade staple fibers may be of the kind referred to above. Short cut staple fibers having a length between 3 and 25 mm may be used. The fiber length of the short cut staple fibers may be between 3 and 20 mm, preferably between 3 and 15 mm and more preferably between 10 and 15 mm.

The forming fabric 10 is redirected into a horizontal direction and on the horizontal portion of the forming fabric 10 a first hydroentangling station 14 is arranged. The wetlaid fibrous web 13 is hydroentangled in said first hydroentangling station 14 while it is supported by the forming fabric 10. The first hydroentangling station 14 can include a transverse bar with a row of nozzles from which very fine water jets under pressure are directed against the wetlaid fibrous web to provide an entangling of the fibers. Suction boxes 15 are arranged under the forming fabric 10 to drain the hydroentangling water.

The entangling pressure used in nozzles of the first hydroentangling station 14 may be relatively low, between 10 and 50 bars, to provide only a slight bonding of the first fibrous web 13. The bonding of the wetlaid fibrous web 13 may only be sufficient for making the web 13 self-supporting, for example so that it may be transferred from the first forming fabric 10 to a second forming fabric 16. The first forming fabric 10 should have a relatively high count (relatively low open area) in order to retain the fibers in the wetlaid web, while the second forming fabric may have a relatively lower count (relatively higher open area), which will be described below.

The tensile strength in MD (machine direction) of the wetlaid fibrous web 13 should be at least 50 N/m in order to be self-supporting, however preferably not more than 100 N/m. Preferably only one row of nozzles 14 is used in the first hydroentangling station. The basis weight of the wetlaid fibrous web 13 may be between 10 and 100 g/m². Further dewatering of the wetlaid fibrous web 13 may, if necessary, take place by means of suction boxes 17 after transfer to the second forming fabric 16 in order to achieve a suitable dry content of the first fibrous web. Since air is drawn through the web in the subsequent spunlaying step (described below) a suitable dry content of the wetlaid fibrous web is between 30 and 50 weight %.

One or more spunlaying stations 19 are arranged to produce spunlaid filaments 18 and lay them on top of the hydroentangled wetlaid fibrous web 13. The spunlaid filaments 18 are made from extruded molten thermoplastic pellets and are laid down directly on the first fibrous web 13 from nozzles 20. The spunlaid filaments 18 are allowed to form a web. Air is drawn through the web in the spunlaying station by suction boxes 21 arranged under the forming fabric 16. In order to allow air to be drawn through the second forming fabric 16, this should have a relatively low count (relatively open area). The spunlaid filaments 18 may be slightly bonded or alternatively unbonded, wherein the spunlaid filaments can move relatively freely from each other. The degree of bonding due to stickiness of the spunlaid filaments is controlled by the distance between the nozzles 20 and the forming fabric 16. If this distance is relatively large, the spunlaid filaments 18 are allowed to cool down before they land on top of the wetlaid fibrous web 13, so that their stickiness is largely reduced. Alternatively cooling of the filaments is achieved in some other way, e.g., by means of using multiple air sources where air is used to cool the filaments when they have been drawn out or stretched to the preferred degree.

Since the spunlaid filaments 18 are laid on top of the moist wetlaid fibrous web 13 the filaments will adhere and stay as they land on the moist web 13, thus keeping the formation which otherwise may be hard to preserve on a forming wire. In order to further improve formation of the spunlaid filaments 18 they may be charged to repel each other, or be laid in sequence by two or more spunlaying stations 19.

The speed of the spunlaid 18 filaments as they are laid down on the wetlaid fibrous web 13 is much higher than the speed of the forming fabric 16, so the spunlaid filaments will form irregular loops and bends as they are collected on the forming fabric on top of the wetlaid fibrous web 13 to form a very randomized precursor web. The basis weight of the formed filament precursor web may be between 10 and 50 g/m$^2$.

The combined web 22 of the continuous filaments 18 adhered to the wetlaid fibrous web 13 of natural fibers and manmade staple fibers is transferred from the forming fabric 16 to a hydroentangling drum 23 where the integration of the combined web 22 starts by hydroenglement in a second hydroentangling station 24 from the side of the wetlaid fibrous web 13. Thus the layer of spunlaid filaments 18 is facing the drum 23. Water jets under high pressure move pulp fibers and staple fibers into the filament layer.

In the embodiment shown in the drawing the second hydroentangling station 24 comprises three rows of hydroentangling nozzles. Any appropriate number of rows of nozzles may be used. The entangling pressure used in the nozzles of the second hydroentangling station 24 is higher than in the first hydroentangling station 14 and is preferably in the range between 70 and 200 bars. The hydroentangling water is drained off through the drum 23. An intense mixing of the staple fibers and pulp fibers (or other natural fibers) and the continuous filaments is achieved in the second hydroentangling station 24. By having the continuous filaments 18 unbonded with no thermal bonding points between them or only slightly bonded, the continuous filaments can twist around and entangle with themselves and with the staple fibers and pulp fibers, which gives a good integration between the different types of fibers and filaments.

The combined web 22, which has been hydroentangled may be transferred to another hydroentangling fabric 25 and hydroentangled in a third hydroentangling station 26 from the same side as in the second hydroentangling station 24, i.e. from the side of the wetlaid fibrous web 13. In the embodiment shown in FIG. 1 the third hydroentangling station 26 comprises three rows of hydroentangling nozzles. However any appropriate number of rows of nozzles may be used in this third hydroentangling station 26. The entangling pressure used in the nozzles of the third hydroentangling station 26 may be in the same range as in the second hydroentangling station 24, i.e. preferably in the range between 70 and 200 bars. The hydroentangling water is drained off through the fabric 25 by means of suction boxes 27. A further integration of the spunlaid filaments and the staple fibers and pulp fibers (or other natural fibers) is achieved in the third hydroentangling station 26 to produce a composite hydroentangled web 28.

However this third hydroentangling station 26 is optional and may thus be omitted.

The water jet pressure in the hydroentangling stations having two or more rows of nozzles may be adapted to have a certain pressure profile with different pressures in the different rows of nozzles.

The hydroentangled composite web 28 is then dried, which can be done on a conventional web drying equipment, preferably of the type used for tissue drying, such as a through-air drying or a Yankee drying equipment. The material is after drying normally wound to form mother rolls before converting. The material is then converted in known ways to suitable formats and packed.

The structure of the material can be changed by further processing such as microcreping, hot calendaring, embossing, etc. Different additives such as wet strength agents, binder chemicals, latexes, debonders, etc. may further be added to the web before or after drying.

The invention claimed is:

1. A method of producing a nonwoven material by hydroentangling a fiber mixture comprising spunlaid filaments, natural fibers and synthetic staple fibers, the method comprising
   wetlaying a first fibrous web of natural fibers and at least 10% by fiber weight of manmade staple fibers by means of inclined wire formation,
   hydroentangling said first fibrous web in a first hydroentangling station,
   laying spunlaid filaments on top of said hydroentangled wetlaid fibrous web to form a combined web, and
   hydroentangling said combined web in a second hydroentangling station, and
   wherein the combined web is hydroentangled from the side of the wetlaid fibrous web in the second hydroentangling station.

2. The method as claimed in claim 1, wherein a fluid pressure used in the first hydroentangling station is between 10 and 50 bars.

3. The method as claimed in claim 1, wherein a fluid pressure used in the second hydroentangling station is between 70 and 200 bars.

4. The method as claimed in claim 1, wherein said wetlaid fibrous web of natural fibers and manmade staple fibers contains between 10 and 40% by fiber weight staple fibers and between 60 and 90% by fiber weight natural fibers.

5. The method as claimed in claim 1, wherein the natural fibers are wood pulp fibers.

6. The method as claimed in claim 1, wherein the manmade staple fibers have a length between 3 and 25 mm.

7. The method as claimed in claim 1, wherein there are no thermal bonding points between the spunlaid filaments.

8. The method as claimed in claim 1, the method further comprising dewatering the hydroentangled wetlaid fibrous web to a dry content of between 30 and 50 weight % before laying spunlaid filaments on top of said hydroentangled wetlaid fibrous web.

9. A nonwoven material produced according to the method in claim 1.

\* \* \* \* \*